UNITED STATES PATENT OFFICE.

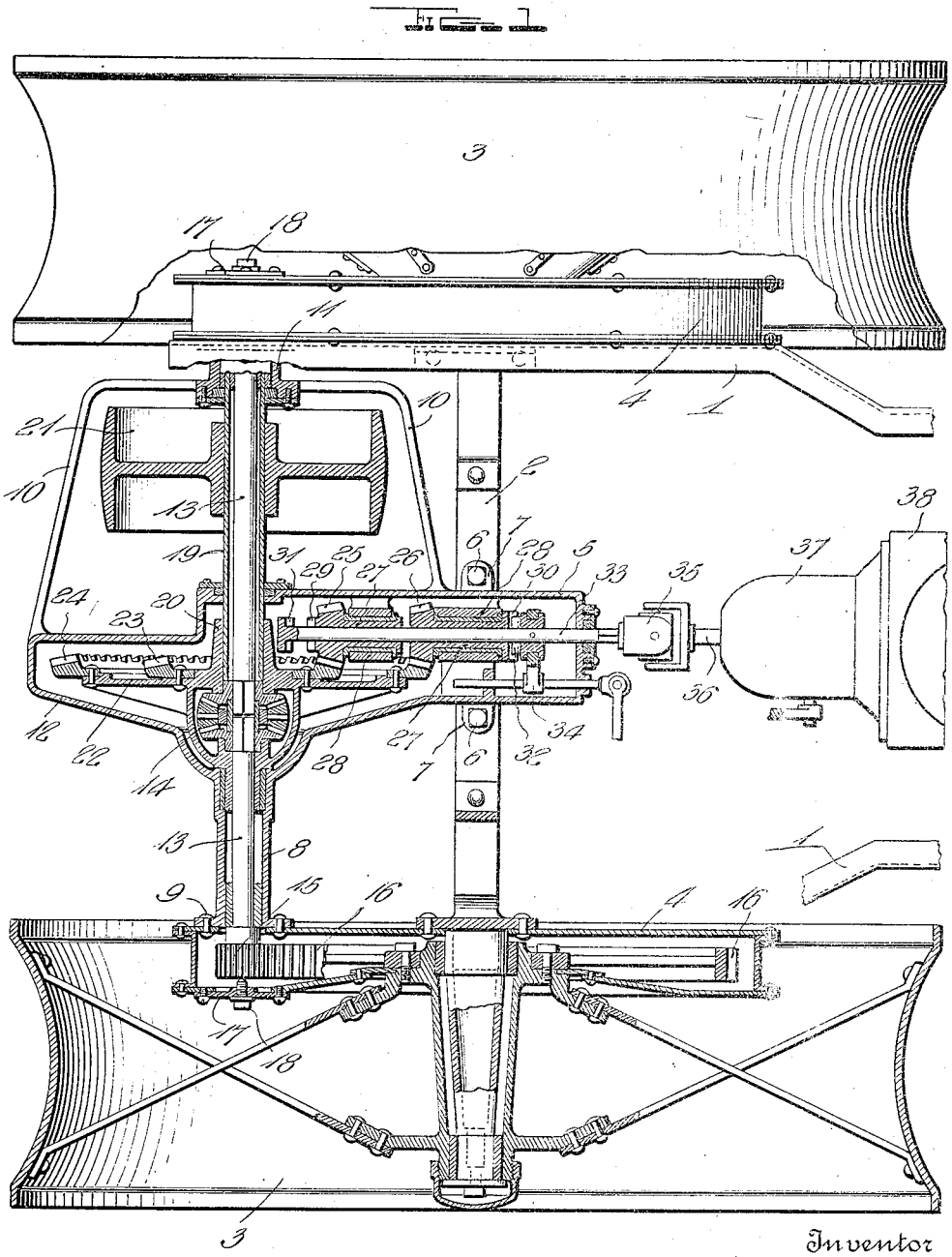

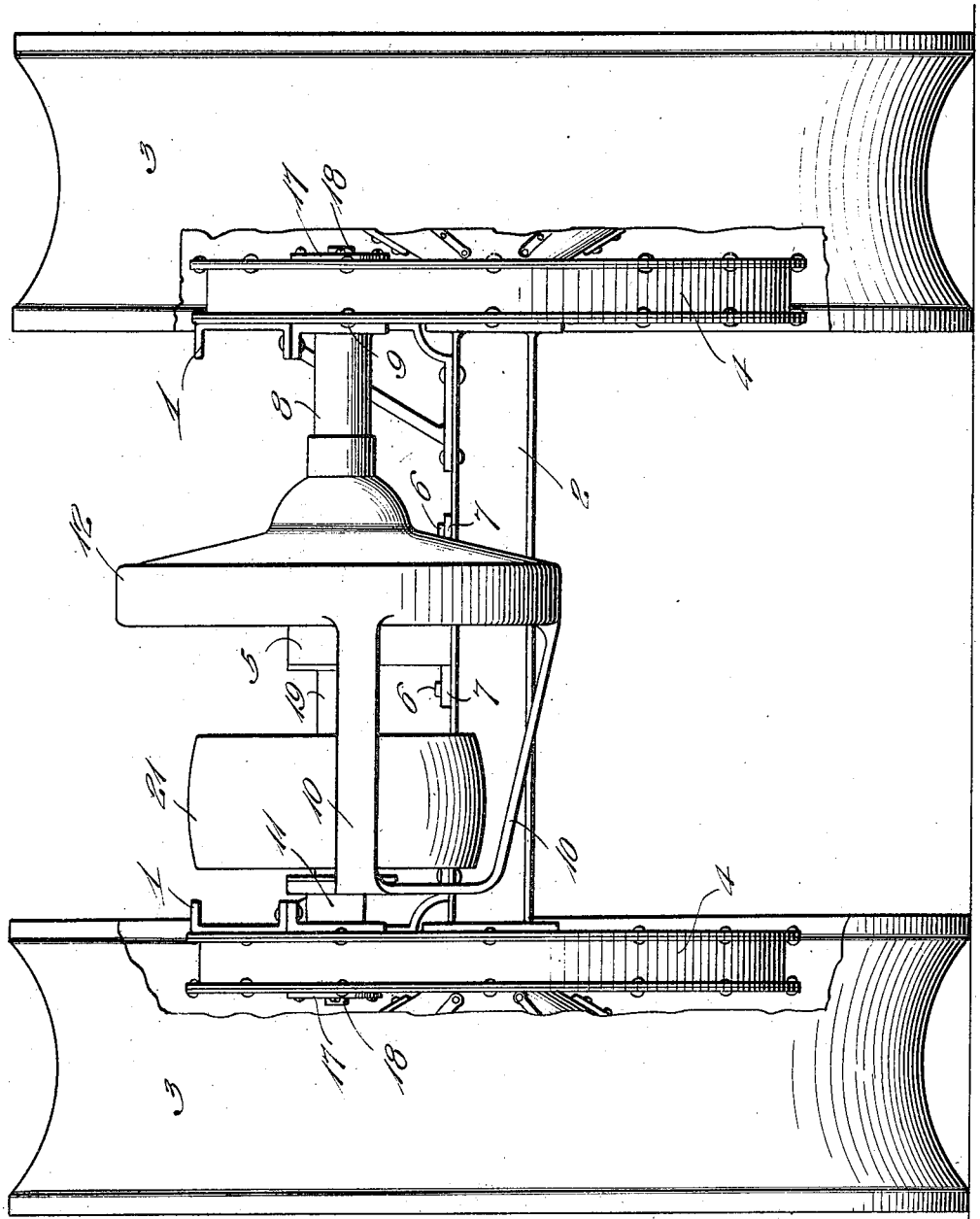

GEORGE IRA GARGETT, OF ALMA, MICHIGAN.

TRANSMISSION-CASING FOR TRACTORS.

1,278,328.

Specification of Letters Patent.  Patented Sept. 10, 1918.

Application filed December 17, 1917. Serial No. 207,563.

*To all whom it may concern:*

Be it known that I, GEORGE I. GARGETT, a citizen of the United States, residing at Alma, in the county of Gratiot and State of Michigan, have invented certain new and useful Improvements in Transmission-Casings for Tractors; and I do declare the following to be a full, clear, and exact description of the invention, such as will enable others skilled in the art to which it appertains to make and use the same.

The principal object of my invention is to provide a comparatively simple tractor which may be driven at the unusually slow speed required for farm work or at a considerably higher speed for road travel.

A further object is to provide novel means for driving farm machinery and the like from the tractor while the latter remains at a standstill.

A still further object is to provide a tractor in which the transmission housing or case and the gear cases containing the wheel driving gears are connected to form part of the main frame structure.

With the foregoing general objects in view, the invention resides in the novel features of construction and unique combinations of parts to be hereinafter fully described and claimed, the descriptive matter being supplemented by the accompanying drawings which form a part of this specification and in which:

Figure 1 is a horizontal section partly in top plan; and

Fig. 2 is a rear elevation with parts of the tractor wheels broken away.

In the drawings above briefly described, the numerals 1 designate the side bars of the tractor frame, 2 has reference to a rigid axle below said bars, 3 designates a pair of tractor wheels on the ends of said axle and 4 indicates a pair of gear cases to which said bars and axle are secured, the ends of the latter passing through said cases as will be clear from Fig. 1.

Positioned longitudinally between the wheels 3 and resting on the axle 2, is a transmission case 5 which is secured to said axle in any preferred manner, bolts 6 being shown for this purpose, said bolts passing through the axle and through lugs 7 on the case 5. A rigid tubular axle casing 8 extends from the transmission case 5 to one of the gear cases 4 and is rigidly secured to the latter at 9, while the opposite side of said case is formed with integral arms 10 extending toward the other case 4 and joined to a bearing 11 which is in turn secured to said case. By the arrangement so far described, the transmission case 5, the gear cases 4, the shaft housing 8 and the arms 9 not only perform their individual functions, but form part of the main tractor frame, producing a simple yet rigid frame structure.

The rear end of the transmission case 5 is enlarged at 12 and the inner ends of the two sections 13 of a differential drive shaft extend into said case as illustrated in Fig. 1, said ends of the shaft sections 13 being connected by differential gearing 14 located within the enlarged portion 12. The outer ends of the shaft section 13 carry pinions 15 meshing with spur gears 16 which are carried by the wheels 3 and mounted in the gear cases 4, said sections and their pinions being removable from engagement with the differential gearing 14 by first detaching plates 17 secured over openings in the outer sides of the gear cases 4, said openings being in line with the pinions and shaft sections as shown in Fig. 1. Set screws 18 carried by the removable plates 17 normally bear against the outer ends of the shaft sections 13 and retain them in engagement with the gearing 14.

One of the shaft sections 13 is rotatably mounted in the shaft housing 8, while the other section passes through a tubular shaft 19 which is driven from the housing 20 of the differential gearing 14, the outer end of said tubular shaft being rotatably mounted in the bearing 11. This shaft thus forms a housing for one of the shaft sections 13 and at the same time it affords means for driving other machinery from the tractor, being provided with a pulley or other suitable means 21 for this purpose, said pulley being located between the spaced arms 10 as shown. During the operation of the tractor, the tubular shaft 19 rotates at the same speed as the shaft sections 13, but when power is to be taken from said tubular shaft for driving other machines, the plates 17 are detached and the shaft sections 13 withdrawn. Driving of the differential housing 20 by the means yet to be described will therefore rotate shaft 19 without propelling the vehicle, and the speed of this shaft may be varied by the variable speed transmission employed for driving said housing 20.

Housing 20 is provided with an integral annular flange 22 carrying an inner and an outer concentric gear ring, these rings being designated at 23 and 24 respectively. A drive pinion 25 meshes with gear 23 and a similar pinion 26 with the gear 24, both pinions having alined tubular hubs 27 rotatably mounted in bearings 28 suitably mounted in the transmission housing 5. The end of pinion 25 is provided with clutch teeth 29 while similar teeth 30 are formed on the end of the hub 27 of the pinion 26, these teeth coacting with similar teeth 31 and 32 respectively which are carried by and movable bodily with a drive shaft 33 which passes rotatably through the alined hollow hubs 27. Suitable means such as 34 are provided for shifting shaft 33 longitudinally to engage either set of its teeth 31—32 with the teeth 29—30 of the pinions 25 and 26 and it will thus be clear that either one of these pinions may be driven. When pinion 25 is driven, the gear ratio is such as to drive the machine or the shaft 19 as the case may be, at a relatively high speed, but driving of pinion 26 will reduce such speed, due to the existing ratio between this pinion and its gear ring 24. By the provision of this transmission, therefore, either the slow speed required in the field or relatively high speed for road travel may be obtained. Also, this variable speed drive is of advantage when the shaft 19 and its pulley 21 are being used for driving other machinery from the tractor.

The front end of shaft 33 passes slidably but non-rotatably into a suitable universal joint or other coupling 35 which is located at the rear end of a transmission shaft 36 leading from a main transmission housing 37 on the rear end of a suitable motor 38, said housing 37 preferably containing the usual set of variable speed gears as well as a reversing mechanism and clutch. Although this means of driving shaft 33 will in most cases be employed, I wish it understood that this shaft could well be connected directly to the engine shaft by means of a suitable clutch, or that any other preferred drive could be utilized.

From the foregoing, taken in connection with the accompanying drawings, it will be obvious that, although my invention is of comparatively simple nature, it will be highly efficient and desirable for the purposes intended, particular emphasis being laid upon the frame structure including the gear cases 4, the transmission case 5, the shaft housing 8 and the arms 10. Also, the tubular shaft 19 with its pulley 21 located between the arms 10, and the variable speed drive for the axle housing 20, are considered highly important.

Since probably the best results are obtained from the several specific details shown and described, these details are preferably employed, but I wish it understood that within the scope of the invention as claimed, numerous minor changes may well be made.

I claim:

1. In a motor driven vehicle, the combination of a frame, a fixed axle supporting the rear end of said frame, a pair of traction wheels rotatable on the ends of said axle, gear cases secured to said frame, and a transmission case resting on and secured to said axle, said transmission case having rigid lateral portions secured to said gear cases; together with gearing in said gear cases operatively associated with said traction wheels, and transmission gearing in said transmission case for driving said first named gearing.

2. In a motor driven vehicle, the combination of a frame, a fixed axle supporting the rear end of said frame, a pair of traction wheels rotatable on the ends of said axle, gear cases secured to said frame, a transmission case resting on and secured to said axle, a shaft housing extending laterally from said transmission case and secured to one of said gear cases, lateral arms spaced apart and extending from said transmission case to the other gear case, said arms being secured to this gear case, transmission gearing in said transmission case, severable driving connections between said gearing and said wheels including gearing in said gear cases and shafts extending oppositely from said transmission case into said gear cases, one of said shafts passing through said shaft housing and the other passing between said arms, and a tubular shaft surrounding said last named shaft and forming a housing therefor, said tubular shaft being also driven by said transmission gearing and having a driving wheel located between said arms for driving other machinery when said severable driving connections are broken.

3. In a motor driven vehicle, the combination of a frame, tractor wheels therefor, differential gearing, severable driving connections between said gearing and said wheels including two shaft sections connected by said gearing, a tubular shaft driven by said gearing and surrounding one of said shaft sections to form a housing therefor, and means on said tubular shaft for taking power therefrom when said severable connections are broken.

4. In a transmission unit for motor driven vehicles, the combination of a transmission case, transmission gearing in said case including differential gearing, a pair of shaft sections extending oppositely from said transmission case and driven by said differential gearing, a housing for one shaft section extending rigidly from said case, a tubular shaft driven by said differential gearing and surrounding the other shaft section to form a housing therefor, and means on said tubular shaft for taking power therefrom to drive other machinery.

5. In a transmission unit for motor driven vehicles, the combination of a transmission case, transmission gearing in said case including differential gearing, a pair of shaft sections extending oppositely from said transmission case and driven by said differential gearing, a housing for one shaft section extending rigidly from said case, a tubular shaft driven by said differential gearing and surrounding the other shaft section to form a housing therefor, a bearing for the outer end of said tubular shaft, an arm extending rigidly from said transmission case and carrying said bearing, and means on said tubular shaft for taking power therefrom to drive other machinery.

In testimony whereof I have hereunto set my hand in the presence of two subscribing witnesses.

GEORGE IRA GARGETT.

Witnesses:
F. H. ROWLAND,
JOHN P. FRENCH.

Copies of this patent may be obtained for five cents each, by addressing the "Commissioner of Patents, Washington, D. C."